United States Patent
Isobe et al.

(10) Patent No.: US 11,291,954 B2
(45) Date of Patent: Apr. 5, 2022

(54) HOLLOW FIBER MEMBRANE MODULE

(71) Applicant: Honeywell International Inc., Morris Plains, NJ (US)

(72) Inventors: Jun Isobe, Torrance, CA (US); Phoebe Henson, Scottsdale, AZ (US); Rebecca Kamire, Buffalo Grove, IL (US); Rehan Zaki, Naperville, IL (US); Stephen Yates, South Barrington, IL (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/866,465

(22) Filed: May 4, 2020

(65) Prior Publication Data

US 2021/0339200 A1    Nov. 4, 2021

(51) Int. Cl.
  *B01D 63/02*    (2006.01)
  *B01D 63/04*    (2006.01)

(52) U.S. Cl.
  CPC ......... *B01D 63/021* (2013.01); *B01D 63/027* (2013.01); *B01D 63/04* (2013.01); *B01D 2313/20* (2013.01)

(58) Field of Classification Search
  CPC .... B01D 63/02; B01D 63/021; B01D 63/022; B01D 63/026; B01D 63/027; B01D 63/043; B01D 63/04; B01D 2313/20; B01D 2313/23
  See application file for complete search history.

(56) References Cited

U.S. PATENT DOCUMENTS

| | | | |
|---|---|---|---|
| 3,708,071 A | 1/1973 | Crowley | |
| 4,631,128 A | 12/1986 | Coplan et al. | |
| 4,758,341 A * | 7/1988 | Banner | B01D 53/22 210/232 |
| 4,881,955 A | 11/1989 | Bikso et al. | |
| 5,188,801 A * | 2/1993 | Fini | B01D 63/02 128/DIG. 3 |
| 5,270,004 A * | 12/1993 | Cosentino | A61M 1/1698 128/DIG. 3 |
| 5,358,689 A | 10/1994 | Jones et al. | |
| 5,702,601 A | 12/1997 | Bikson et al. | |

(Continued)

FOREIGN PATENT DOCUMENTS

| | | |
|---|---|---|
| CN | 102580552 | 7/2012 |
| DE | 233946 A1 | 3/1986 |
| WO | 9828065 | 7/1998 |

OTHER PUBLICATIONS

U.S. Appl. No. 16/831,565, by Honeywell International Inc. (Inventors: Pheobe Henson et al.), filed Mar. 26, 2020.

(Continued)

*Primary Examiner* — Pranav N Patel
(74) *Attorney, Agent, or Firm* — Shumaker & Sieffert, P.A.

(57) ABSTRACT

In some examples, a membrane module includes a fiber bundle. The fiber bundle includes a tubular first region and a tubular second region positioned around the tubular first region. One of the first or second regions includes hollow fibers oriented along an axis of the fiber bundle. Another of the first or second regions includes hollow fibers that are not colinear in a radial direction from the axis of the fiber bundle. A void fraction of the second region is different from a void fraction of the first region.

20 Claims, 6 Drawing Sheets

(56) References Cited

U.S. PATENT DOCUMENTS

| | | | |
|---|---|---|---|
| 6,004,511 A * | 12/1999 | Biscegli | A61M 1/1698 422/44 |
| 6,623,637 B1 | 9/2003 | Monzen et al. | |
| 6,805,731 B2 | 10/2004 | Cheng et al. | |
| 6,824,679 B1 | 11/2004 | Dzengeleski et al. | |
| 8,545,754 B2 | 10/2013 | Carpenter et al. | |
| 10,668,428 B2 | 6/2020 | Weng et al. | |
| 2006/0065588 A1* | 3/2006 | Koch | B01D 53/22 210/321.88 |
| 2016/0009578 A1* | 1/2016 | Cote | B01D 63/027 210/615 |
| 2018/0243682 A1 | 8/2018 | Isobe et al. | |
| 2018/0243685 A1 | 8/2018 | Henson et al. | |
| 2018/0265993 A1 | 9/2018 | Kamire et al. | |
| 2020/0061528 A1 | 2/2020 | Henson et al. | |
| 2020/0122084 A1 | 4/2020 | Henson et al. | |

OTHER PUBLICATIONS

U.S. Appl. No. 16/859,770, by Honeywell International Inc. (Inventors: Dacong Weng et al.), filed Apr. 27, 2020.

Wan et al., "Design and fabrication of hollow fiber membrane modules," Journal of Membrane Science, ELEVIER, May 12, 2017, 12 pp.

* cited by examiner

HOLLOW FIBER MEMBRANE MODULE

TECHNICAL FIELD

The present disclosure relates to hollow fiber membrane modules and techniques for manufacturing hollow fiber membrane modules.

BACKGROUND

Membrane contactors bring two immiscible fluids into contact with one another to separate one or more components from a fluid and/or transfer one or more components from one fluid to the other. Membrane contactors may include bundles of hollow fibers that include a tube side within the hollow fibers and a shell side outside the hollow fibers. Tube sheets separate a fluid on the tube side from a fluid on the shell side, such that the only transfer between the fluid on the tube side and the fluid on the shell side occurs through walls of the hollow fibers. Fine pores in the hollow fiber walls may permit a greater amount of transfer of one component in a fluid than another component in the fluid due to surface tension and/or pressure differential effects. Mass transfer and separation of component from one fluid to another fluid may be caused by diffusion driven by a difference in concentration of a component between the two fluids.

SUMMARY

The disclosure describes systems and techniques for separating components from a fluid using a fiber bundle that includes more than one fiber orientation. Example fiber bundles include two or more tubular concentric or spirally-wound regions having different fiber orientations between adjacent regions. A first region includes hollow fibers oriented along an axis of the fiber bundle. Due to the parallel orientation of the axially-aligned hollow fibers, this region has a relatively low void fraction that results in a relatively high packing density and surface area. An adjacent second region includes hollow fibers that are not oriented along the axis of the fiber bundle and, as a result, are not colinear with the axially-aligned hollow fibers. Due to this non-colineariry between the axially-aligned hollow fibers and the non-axially-aligned hollow fibers, an interface between the two regions has a relatively high void fraction and a relatively tortuous path that results in a relatively low pressure drop and a relatively high mass transfer.

In some instances, the non-axially-aligned second region described above may have a higher void fraction than the axially-aligned first region. For example, the non-axially-aligned region may include cross-wound groups of hollow fibers that form interfaces with adjacent groups having different orientations, such that the second region may have a relatively low pressure drop and high mass transfer compared to the first region. As a result, fiber bundles described herein may reduce stagnant flow within regions of hollow fibers compared to fiber bundles having only colinear hollow fibers and maintain a relatively high packing density and mass transfer compared to fiber bundles having only skeined hollow fibers.

Various properties and configurations of these regions, such as number, thicknesses, and orders of the regions, may be selected to produce membranes having properties that may be more difficult or costly to achieve with a single orientation of hollow fibers. For example, a fiber bundle may have a higher packing density and a higher surface area for a fixed volume than a fiber bundle having only non-colinear hollow fibers, and may have a lower weight, lower power, and/or higher shell side mass transfer for a fixed volume than a fiber bundle having only colinear hollow fibers.

In some examples, the disclosure describes a membrane module that includes a fiber bundle. The fiber bundle includes a tubular first region and a tubular second region positioned around the tubular first region. One of the first or second regions includes hollow fibers oriented along an axis of the fiber bundle. Another of the first or second regions includes hollow fibers that are not colinear in a radial direction from the axis of the fiber bundle. A void fraction of the second region is different from a void fraction of the first region.

In some examples, the disclosure describes a membrane module, such as described above, that further includes a membrane housing encasing the fiber bundle. The membrane housing includes an inlet, a first outlet, and a second outlet. The inlet is configured to receive a first fluid composition into a first end of the fiber bundle. The first outlet configured to discharge a second fluid composition out of a second end of the fiber bundle. The second outlet configured to discharge a third fluid composition out of a side of the fiber bundle.

In some examples, the disclosure describes a method of removing a contaminant from a first fluid using a membrane module that includes the fiber bundle described above. The method includes receiving, by a first inlet of the membrane module, a first fluid composition into a first end of a fiber bundle and discharging, by a first outlet of the membrane module, a second fluid composition out of a second end of the fiber bundle. The method includes receiving, by a second inlet of the membrane module, a third fluid composition to a side of the fiber bundle and discharging, by a second outlet of the membrane module, a fourth fluid composition from a side of the fiber bundle. The second fluid composition has a different concentration of the contaminant than the first fluid composition, while the fourth fluid composition has a different concentration of the contaminant than the third fluid composition.

In some examples, the disclosure describes a method for making a membrane module that includes forming a fiber bundle by positioning a tubular second region around a tubular first region. One of the first or second regions includes hollow fibers oriented along an axis of the fiber bundle. Another of the first or second regions includes hollow fibers that are not colinear in a radial direction from the axis of the fiber bundle. A void fraction of the second region is different from a void fraction of the first region.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Membranes described herein may be utilized as part of a membrane module, such as a membrane contactor module or membrane separator module, for transferring or separating one or more components from a fluid stream. For example, membrane contactors may be used in contaminant removal system of aircraft, spacecraft, or other resource-limited environments to absorb contaminants from a spent air stream into a liquid sorbent and desorb the contaminants into a contaminant stream.

Figure 1A:
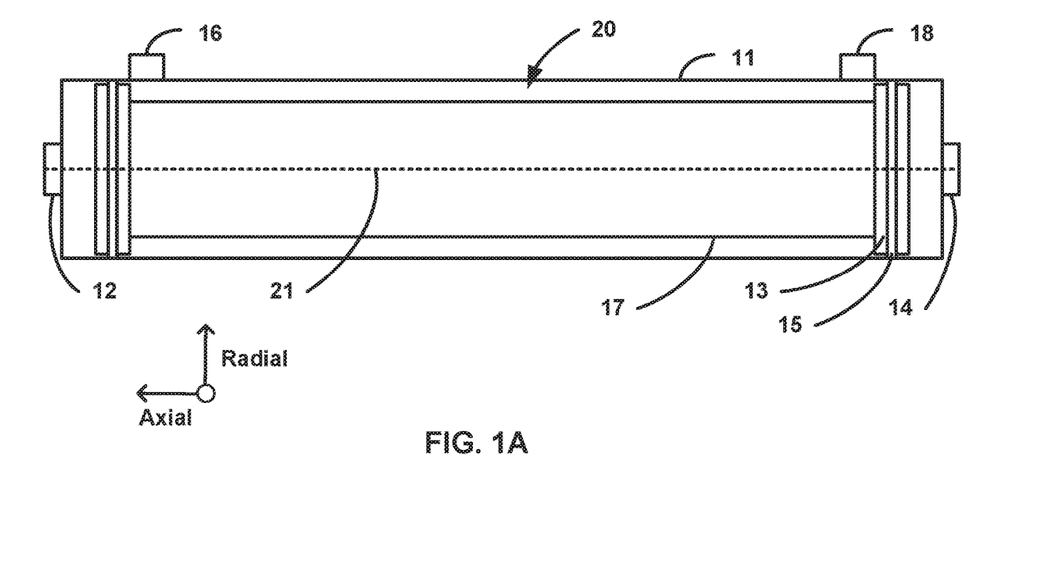
FIG. 1A is a side view partial cross-sectional diagram illustrating an example membrane contactor module.

FIG. 1A is a side view partial cross-sectional diagram of an example membrane module 10. Membrane module 10 includes a membrane housing 11 encasing a fiber bundle 20. While shown in FIG. 1A as a cylindrical housing, membrane housing 11 may include any shape. Membrane housing 11 includes a first inlet 12, a first outlet 14, a second outlet 18, and optionally a second inlet 16. Membrane module 10 may be configured to permit flow of a fluid from first inlet 12 through fiber bundle 20 to first outlet 14. Membrane module 10 may define an axis 21 that corresponds to flow of the fluid from first inlet 12 to first outlet 14. In examples in which membrane module 10 is a contactor module, membrane module 10 may be configured to permit flow of a fluid from second inlet 16 to second outlet 18. In examples in which membrane module 10 is a separator module, membrane module 10 may be configured to permit flow from fiber bundle 20 to second outlet 18. Membrane module 10 includes a tubesheet 13 and one or more seals 15 to reduce or prevent flow of fluid from first inlet 12 to a shell side of fiber bundle 20 and/or flow of fluid from second inlet 16 to a tube side of fiber bundle 20 without passing through fiber bundle 20.

Membrane module 10 may be configured to transfer or separate one more components from a fluid stream. For example, membrane module 10 may include one or more membranes that permit only certain components to migrate through the membranes, or permit certain components to migrate through the membranes at different rates, such that the components may be transferred from the fluid stream or separated from the fluid stream. A variety of components may be transferred or separated including, but not limited to, carbon dioxide, water vapor, volatile gases, and the like. A variety of fluid streams may be treated including, but not limited to, a controlled environment, such as an aircraft cabin air stream, a restricted environment, such as a spacecraft cabin air stream, and the like.

Fiber bundle 20 includes hollow porous fibers. Each hollow fiber includes an interior tube side and an exterior shell side. Dimensions of these hollow fibers may be less than about 5 millimeters, and a pore dimension may be less than about 5 micrometers. Fiber bundle 20 may include other structures, such as baffles, between the hollow fibers or between the hollow fibers and an outer shell of membrane housing 11 to improve mixing of a fluid on the shell side. Optionally, flow on the shell side may be swirled or turbulated using duct bends prior to entry into membrane module 10 and/or angling flow entry vector into membrane module 10 and/or using guide vanes or similar structures to enhance mass transfer through the membrane. A wide variety of materials may be used for the hollow fibers including, but not limited to, polypropylene, polyvinylidene fluoride, polysulfone, polyimide, polytetrafluoroethylene, and the like. In some examples, a coating can be applied either of PTFE or a crosslinked siloxane, to prevent liquid flow through the pores. Fiber bundle 20 may include a covering 17.

In some examples, membrane module 10 may be a contactor module. For example, a contactor module may be configured to transfer a component from a first fluid to a second fluid. When used as a contactor module, membrane module 10 may be configured to transfer a component from a first fluid to a second fluid. First inlet 12 may be configured to receive a first fluid into a first end of fiber bundle 20 and first outlet 14 may be configured to discharge the first fluid out of a second end of fiber bundle 20. Second inlet 16 may be configured to receive a second fluid, such as a sweep gas, into a side of fiber bundle 20 and second outlet 18 may be configured to discharge the second fluid out of the side of fiber bundle 20. The inlet composition of the second fluid at second inlet 16 may include a lower concentration of a contaminant than an inlet composition of the first fluid at first inlet 12. The difference in concentration of the component between the first fluid and the second fluid may drive migration of the contaminant from the first fluid to the second fluid. As a result, an outlet composition of the first fluid at first outlet 14 may include a lower concentration of the contaminant than the inlet composition of the first fluid at first inlet 12, while an outlet composition of the second fluid at second outlet 18 may include a higher concentration of the contaminant than the inlet composition of the second fluid at second inlet 16.

In such examples, the material of the hollow fibers may be selected such that an ionic liquid may not wet the pores, and the trans-membrane pressure is kept low enough to prevent pore penetration. The ionic liquid flow can be either on a tube side of fiber bundle 20 or a shell side of fiber bundle 20, while air may be flowed on the other side. In example operation as a scrubber to remove $CO_2$ and water, clean ionic liquid may be flowed on one side of fiber bundle 20, and air containing $CO_2$ on an opposite side of fiber bundle 20. In this example, since fiber bundle 20 may be hydrophobic, vapor, including $CO_2$ and water, may be allowed to cross the hollow fibers of fiber bundle 20 to be absorbed by the ionic liquid and carried away to a reservoir, while the ionic liquid may not pass through the hollow fibers of fiber bundle 20, and is thus contained from the airstream. In operation as a stripper, loaded ionic liquid could be flowed on one side of fiber bundle 20, and a small flow of sweep gas on an opposite side of fiber bundle 20. A temperature of the liquid may be raised and a partial pressure of $CO_2$ and water on the gas phase side may be decreased to create a driving force for $CO_2$ and water to transfer, such as by creating a vacuum on the gas phase side. The stripper may also take advantage of any differences in desorption temperature or pressure between $CO_2$ and water to separate the two constituents without an additional separator device.

In some examples, membrane module 10 may be a separator module. For example, a separator module may be configured without second inlet 16. When used as a separator module, membrane module 10 may be configured to separate a component from a fluid. First inlet 12 may be configured to receive a fluid into a first end of fiber bundle 20. First outlet 14 may be configured to discharge the fluid out of a second end of fiber bundle 20, while second outlet 18 may be configured to discharge the fluid out of the side of fiber bundle 20. The inlet composition of the fluid at first inlet 12 may include a higher concentration of a contaminant than a shell side of fiber bundle 20. The difference in concentration of the component between the fluid and shell side may drive migration of the contaminant from the fluid to the shell side at a higher rate than other components of the fluid. As a result, an outlet composition of the fluid at first outlet 14 may include a lower concentration of the contaminant than the inlet composition of the fluid at first inlet 12, while an outlet composition of the fluid at second outlet 18 may include a higher concentration of the contaminant than the inlet composition of the fluid at first inlet 12. In example operation as a dehumidifier to remove water, air containing humidity may be flowed through fiber bundle 20. In this example, since fiber bundle 20 may be hydrophilic, water vapor may be allowed to cross the hollow fibers of fiber bundle 20 at a higher rate than other components.

For both contactor and separator modules, mass transfer of the contaminant through a hollow fiber of fiber bundle 20 may be driven by a driving force (e.g., partial pressure or concentration gradient) through the hollow fiber. The flux of the contaminant through the hollow fiber may be related to a surface area of the hollow fiber, various material properties of the hollow fiber, the driving force gradient through the hollow fiber, and the like. As the contaminant travels through the hollow fiber from the feed side to the permeate side (or vice versa), flow of fluid on the permeate side may remove the contaminant to maintain a gradient through the hollow fiber and prevent equilibrium from being reached. Correspondingly, the flux of the contaminant through hollow fibers of fiber bundle 20 may be related to a number of hollow fibers (e.g., surface area) in a given volume, a pressure drop through a shell side of the hollow fibers (e.g., tortuosity of shell side and fluid flow rate on the shell side), a pressure drop through a tube side of the hollow fibers (e.g., tortuosity of tube side and fluid flow rate on the tube side), and the like.

Fiber bundle 20 includes regions that include hollow fibers having different relative orientations. An orientation of hollow fibers may affect a variety of properties of the corresponding region including, but not limited to, a packing density of the hollow fibers, a surface area of the hollow fibers in a particular volume, a pressure drop on a shell side of the hollow fibers, a pressure drop on a tube side of the hollow fibers, a tortuosity of a fluid path on a tube side of the hollow fibers, a void fraction of a volume of the hollow fibers, a durability of a fiber bundle of the hollow fibers, a manufacturability of a fiber bundle of the hollow fibers, and/or the like.

Fiber bundle 20 includes at least one region that includes hollow fibers oriented along (i.e., parallel to) a same axis 21 of fiber bundle 20 ("colinear hollow fibers"). For example, a central axis of each colinear hollow fiber may be oriented substantially parallel to axis 21, such that all colinear hollow fibers within the region may be substantially parallel to other colinear hollow fibers within the region. Fiber bundle 20 also includes at least one region that includes hollow fibers that are not colinear with other hollow fibers in the region in a radial direction with axis 21 of fiber bundle 20 ("non-colinear hollow fibers"). For example, a first portion of hollow fibers a first radial distance from axis 21 may not be oriented parallel to a second portion of hollow fibers a second radial distance from axis 21.

Figure 1B:
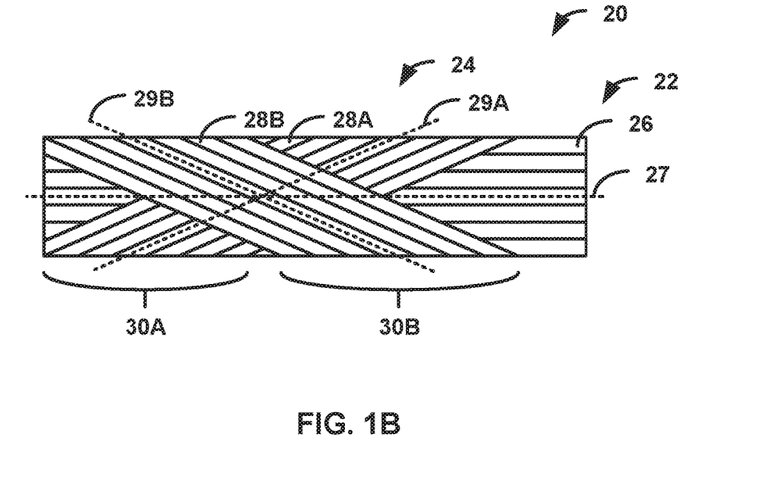
FIG. 1B is a side view diagram illustrating a portion of a fiber bundle that includes a colinear region having colinear hollow fibers and a non-colinear region having non-colinear hollow fibers.

FIG. 1B is a side view diagram illustrating a portion of a fiber bundle 20 that includes a colinear region 22 having colinear hollow fibers 26 and a non-colinear region 24 having non-colinear hollow fibers 28. An axis 27 of each colinear hollow fiber 26 may be oriented along axis 21 of fiber bundle 20, such that colinear region 22 may have relatively small voids between adjacent colinear hollow fibers 26. In some examples, the void fraction of colinear region 22 is between about 0.093 and about 0.186.

Non-colinear region 24 includes non-colinear hollow fibers 28A with an axis 29A oriented in a first direction and non-colinear hollow fibers 28B with an axis 29B oriented in a second direction (referred to collectively as "non-colinear hollow fibers 28"). Colinear hollow fibers 26 are not be oriented in a same direction as non-colinear hollow fibers 28, such that colinear region 22 and non-colinear region 24 may have discontinuities or voids between regions 22 and 24. Each discontinuity may generate turbulence, increase pressure drop, and create increased porosity. Fiber bundle 20 may have a number and/or distribution of these discontinuities to reduce stagnant flow in fiber bundle 20.

In some examples, non-colinear region 24 may have discontinuities and/or voids within non-colinear region 24. In the example of FIG. 1B, non-colinear region 24 includes a plurality of groups of hollow fibers 30A and 30B (referred to individually as "group of hollow fibers 30" and collectively as "groups of hollow fibers 30"). Group of hollow fibers 30A includes non-colinear hollow fibers in the first direction 28A, while group of hollow fibers 30B includes non-colinear hollow fibers in the second direction 28B. Each group of hollow fibers 30 may not be oriented in a same direction as adjacent groups of hollow fibers 30, such that non-colinear region 24 may have relatively large voids between adjacent groups of hollow fibers 30. In some examples, the void fraction of non-colinear region 24 is between about 0.215 and about 0.43.

Colinear hollow fibers 26 may be packed more tightly into a fixed volume (e.g., higher packing density) than non-colinear hollow fibers and/or may be assembled without the use of a central supportive structure, such as a mandrel. As a result, colinear region 22 with colinear hollow fibers 26 may have a greater number of hollow fibers, and thus a higher surface area, than non-colinear region 24 with non-colinear hollow fibers. However, the higher packing density and lower tortuosity of colinear hollow fibers 26 may result in a relatively high pressure drop on a shell side of colinear hollow fiber 26, thereby creating regions of relative stagnancy. These regions of relatively stagnancy may be characterized by a low void fraction and result in relatively high local concentrations of a component that has been separated and/or transferred from a fluid. As explained above, a concentration and/or partial pressure gradient may drive transfer of the component through the hollow fiber, such that high local concentrations of the component may result in lower shell side mass transfer.

On the other hand, non-colinear hollow fibers 28 may be packed less tightly into a fixed volume (e.g., lower packing density) than colinear hollow fibers 26 and may be assembled with the use of a central supportive structure, such as a mandrel. As a result, non-colinear region 24 with non-colinear hollow fibers 28 may have a lesser number of hollow fibers, and thus lower surface area, than colinear region 22 with colinear hollow fibers 26. However, the lower packing density and higher tortuosity of the non-colinear hollow fibers 28 may create relatively turbulent regions between hollow fibers, characterized by a high void fraction and resulting in relatively low local concentrations of the component that has been separated and/or transferred from the fluid and higher shell side mass transfer of the component into the void regions. As such, a void fraction of non-colinear region 24 may be higher than a void fraction of colinear region 22. A lower pressure drop on a shell-side, due to a higher void fraction of colinear region 22, and on a tube-side, due to a lower number of hollow fibers, may reduce an amount of power used to flow the fluid through the hollow fibers.

In operation, membrane module 10 may be used to remove a contaminant, such as carbon dioxide and water, from a first fluid, such as an ionic sorbent, into a second fluid, such as a sweep gas stream. First inlet 12 may receive a first composition of the ionic sorbent into a first end of fiber bundle 20 and first outlet 14 may discharge a second composition of the ionic sorbent out of a second end of fiber bundle 20. Second inlet 16 may receive a first composition of the sweep gas stream to a first side of fiber bundle 20 and discharge a second composition of the ventilation stream from a second side of fiber bundle 20. The carbon dioxide and water may transfer through the hollow fibers of fiber bundle 20 into voids between the hollow fibers. As a result, the second composition of the ionic sorbent has a lower concentration of carbon dioxide and water than the first composition of the ionic sorbent, while the second composition of the sweep gas stream has a higher concentration of the carbon dioxide and water than the first composition of the sweep gas stream. The discontinuities between colinear region 22 and non-colinear region 24 may create a relatively high void fraction from which to remove the carbon dioxide and water and, correspondingly, a relatively high driving force through the hollow fibers. In some examples, the void fraction of non-colinear region 24 is greater than a void fraction of colinear region 22, such that colinear region 22 may have a relatively large surface area through which to transfer the carbon dioxide and water, while non-colinear region 24 may have a relatively high void fraction from which to remove the carbon dioxide and water and, correspondingly, a relatively high driving force through the hollow fibers.

By including both regions 22 and 24 of colinear and non-colinear hollow fibers 26 and 28, respectively, fiber bundle 20 may include regions or discontinuities between regions having properties that moderate and/or complement properties of other regions. For example, fiber bundle 20 may have a higher packing density and a higher surface area for a fixed volume and/or a smaller size for a fixed number of hollow fibers than a fiber bundle having only non-colinear hollow fibers. As another example, fiber bundle 20 may have a lower weight, lower power, and/or higher shell side mass transfer for a fixed volume than a fiber bundle having only colinear hollow fibers. In this way, fiber bundle 20 may have customized properties that may not be possible using a homogeneous distribution of either colinear or non-colinear fibers.

In some examples, a relative volume and/or thickness of colinear regions 22 and non-colinear regions 24 may be selected to achieve desired operating characteristics, such as mass transfer and/or pressure drop, through fiber bundle 20. In some examples, a volume ratio of colinear region 22 to non-colinear region 24 may be between about 10:90 to about 90:10. In some examples, a radial thickness (e.g., along a radius from axis 21) ratio of colinear region 22 to non-colinear region 24 from axis 21 may be between 1:3 to about 3:1. For example, a volume ratio of colinear region 22 to non-colinear region 24 may be about 50:50.

Figure 2A:
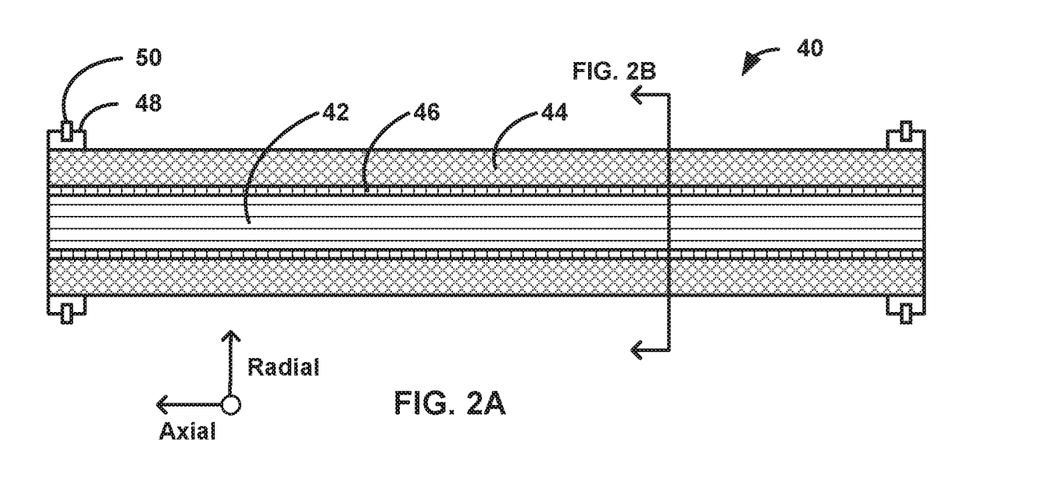
FIG. 2A is a side view cross-sectional diagram of an example fiber bundle of a membrane module.
Figure 2B:
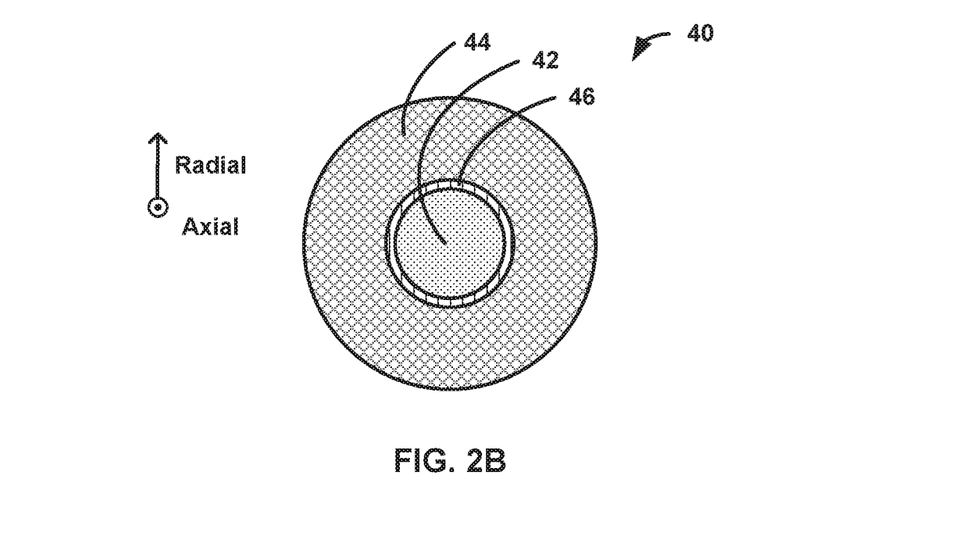
FIG. 2B is a front view cross-sectional diagram of an example fiber bundle of a membrane module.

In some examples, fiber bundles described herein may include an inner colinear region and an outer non-colinear region. FIG. 2A is a side view cross-sectional diagram of a fiber bundle 40, while FIG. 2B is a front view cross-sectional diagram of fiber bundle 40. Fiber bundle 40 includes a tubular inner colinear region 42 and a tubular outer non-colinear region 44 positioned around inner colinear region 42. In the example of FIG. 2B, inner colinear region 42 includes hollow fibers oriented along an axis of fiber bundle 40, while outer non-colinear region 44 includes hollow fibers that are not colinear with other hollow fibers in a radial direction from the axis of fiber bundle 40. As such, a void fraction of inner colinear region 42 may be different from a void fraction of outer non-colinear region 44, such as described with respect to colinear region 22 and non-colinear region 24, respectively, of FIGS. 1B and 1C.

In the example of FIGS. 2A and 2B, inner colinear region 42 may be configured to provide support for outer non-colinear region 44 during formation of outer non-colinear region 44. For example, outer non-colinear region 44 may include a platform layer, such as a mandrel or other supportive structure, around which the plurality of groups of hollow fibers may be wound. Inner colinear region 42 may provide such support while continuing to provide a volume through which a fluid may transmit. As such, inner colinear region 42 may act as a mandrel for outer non-colinear region 44. Colinear hollow fibers of inner colinear region 42 may support each other to provide a substantially stiff and strong platform layer to support formation of outer non-colinear region 44. For example, inner colinear region 42 may include one or more binder regions (not shown) at each end of inner colinear region 42 that bind together hollow fibers. As a result, fiber bundle 40 may have a relatively high surface area for mass transfer of contaminants compared to a fiber bundle that does not include an inner region of hollow fibers aligned along an axis of the fiber bundle.

In some examples, fiber bundle 40 may include a porous shell 46 between inner colinear region 42 and outer non-colinear region 44. Porous shell 46 may be configured to control mass transfer of one or more contaminants between inner colinear region 42 and outer non-colinear region 44. For example, porous shell 46 may include a plurality of openings configured permit the contaminant to pass through and intermediate regions between the plurality of openings configured to prevent the contaminant from passing through or redirect the contaminant to the plurality of openings. In some examples, the plurality of openings in porous shell 46 may be between about 50% and about 99%. Porous shell 46 may have a variety of forms including, but not limited to, a mesh, a perforated cylinder, and the like.

In some examples, porous shell 46 may include a plurality of openings having different sizes and/or a different concentration along fiber bundle 40. For example, as a first fluid is transported through a hollow fiber, the concentration of the contaminant may decrease. Porous shell 46 may present varying porosity along a length of fiber bundle 40 to offer favorable flow direction of concentration gradients to increase mass flux of the entire fiber bundle, such as by having a higher surface area of the plurality of openings near an outlet end of fiber bundle 40 and a lower surface area of the plurality of openings near an inlet end of fiber bundle 40. In some examples, a surface area of the plurality of openings at the outlet end of fiber bundle 40 is at least 10% greater than a surface area of the plurality of openings at the inlet end of fiber bundle 40.

In some examples, porous shell 46 may be configured to provide support for inner colinear region 42 and/or outer non-colinear region 44. For example, porous shell 46 may bind hollow fibers of inner colinear region 42 together, which may reduce or eliminate an amount of binder used to bind hollow fibers of inner colinear region 42. As another example, porous shell 46 may provide support for outer non-colinear region 44 during formation of outer non-colinear region 44.

Figure 3:
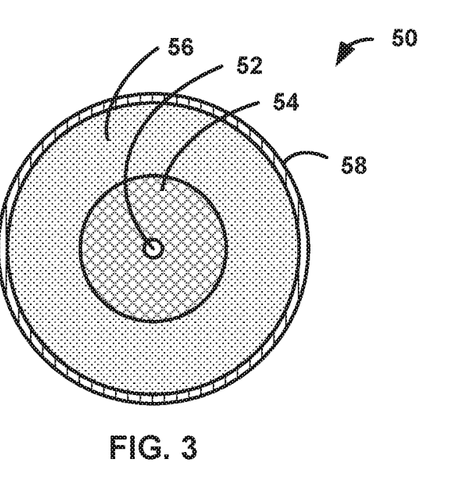
FIG. 3 is a front view cross-sectional diagram of an example fiber bundle of a membrane module having an axially oriented region around a non-co-linear region.

In some examples, fiber bundles described herein may include an inner non-colinear region and an outer colinear region. For example, non-colinear fibers may be longer and may pose higher pressure drop through the fiber, which may assist in spreading a flow over an inlet tubesheet. Additionally or alternatively, inner non-colinear region may have higher radial flow, which may assist in sweeping a flow over the outer colinear regions, thereby increasing their efficiency, such as for air separation modules (ASM). FIG. 3 is a front view cross-sectional diagram of a fiber bundle 50. Fiber bundle 50 includes a mandrel 52, a tubular inner non-colinear region 54 positioned around mandrel 52, a tubular outer colinear region 56 positioned around tubular inner non-colinear region 54, and a porous shell 48 positioned around outer colinear region 56. A void fraction of inner non-colinear region 54 is different from a void fraction of outer colinear region 56. Outer colinear region 56 includes hollow fibers oriented along an axis of fiber bundle 50. Inner non-colinear region 54 includes hollow fibers that are not colinear in the radial direction from the axis of fiber bundle 50. As such, the void fraction of inner non-colinear region 54 is higher than the void fraction of outer colinear region 56, such as described with respect to non-colinear region 24 and colinear region 22, respectively, of FIGS. 1B and 1C.

In the example of FIG. 3, mandrel 52 may be configured to provide support for inner non-colinear region 54 during formation of inner non-colinear region 54. For example, inner non-colinear region 54 may include mandrel 52 as a platform layer around which a plurality of groups of hollow fibers may be wound to form inner non-colinear region 54. Inner non-colinear region 54 may have a relatively high shell-side mass transfer further from an outer surface of fiber bundle 50, while outer colinear region 56 may have a relatively lower shell-side mass transfer closer to an outer surface of fiber bundle 50. As a result, fiber bundle 50 may have a relatively high shell-side mass transfer in regions having a relatively high driving force (e.g., near a center of fiber bundle 50) and may have a relatively low shell-side mass transfer, and relatively high surface area, in regions having a relatively low driving force (e.g., near an outer surface of fiber bundle 50).

Figure 4:
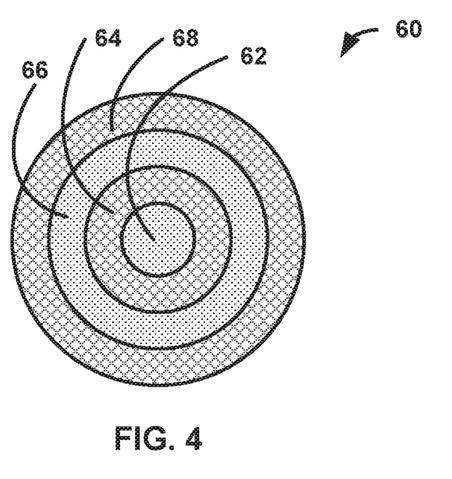
FIG. 4 is a front view cross-sectional diagram of an example fiber bundle of a membrane module having more than two regions.

In some examples, fiber bundles described herein may include multiple regions of either of colinear regions of colinear hollow fibers or non-colinear regions of non-colinear hollow fibers. For example, multiple regions may better distribute flow throughout the module. FIG. 4 is a front view cross-sectional diagram of fiber bundle 60 having more than two regions. Fiber bundle 60 includes a tubular colinear first region 62, a tubular non-colinear second region 64 positioned around tubular colinear first region 62, a tubular colinear third region 66 positioned around tubular non-colinear second region 64, and a tubular non-colinear fourth region 68 positioned around tubular colinear third region 66. Colinear first region 62 and colinear third region 66 each include hollow fibers oriented along the axis of fiber bundle 60. Non-colinear second region 64 and non-colinear fourth region 68 include hollow fibers that are not colinear in the radial direction from the axis of fiber bundle 60. A void fraction between each adjacent region may be higher than either adjacent region. In some examples, a void fraction of each of non-colinear second region 64 and fourth region 68 may be higher than a void fraction of each of colinear first region 62 and third region 66. By alternating between colinear regions 62 and 66 having relatively low mass transfer and non-colinear regions 64 and 68 optionally having relatively high mass transfer, contaminants in relatively low mass transfer areas may be closer to relatively high mass transfer areas (e.g., voids between regions or high void fraction regions), thereby creating a more even mass transfer radially through fiber bundle 60 compared to fiber bundles that do not include alternating layers of colinear and non-colinear regions.

Figure 5:
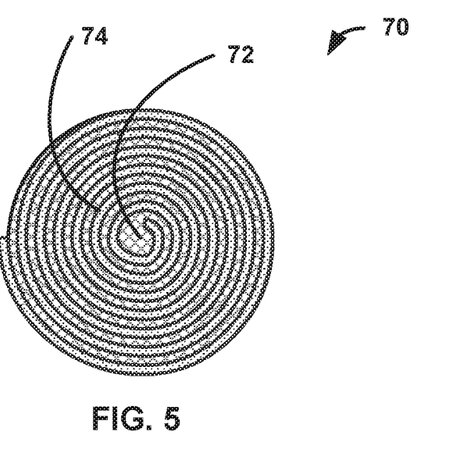
FIG. 5 is a front view cross-sectional diagram of an example fiber bundle having more than two regions spirally-wound.

In some examples, fiber bundles described herein may include spirally-wound regions of colinear regions of colinear hollow fibers and non-colinear regions of non-colinear hollow fibers. For example, spirally-wound regions may better guide shell-side flow. FIG. 5 is a front view cross-sectional diagram of fiber bundle 70 having more than two regions spirally-wound. Fiber bundle 70 includes a spiral colinear region 72 and a spiral non-colinear region 74 positioned around spiral colinear region 72. Colinear region 72 includes hollow fibers oriented along the axis of fiber bundle y0. Non-colinear region 74 includes hollow fibers that are not colinear in the radial direction from the axis of fiber bundle 70. In some examples, a void fraction of each of non-colinear second region 64 and fourth region 68 may be higher than a void fraction of each of colinear first region 62 and third region 66.

Figure 6:
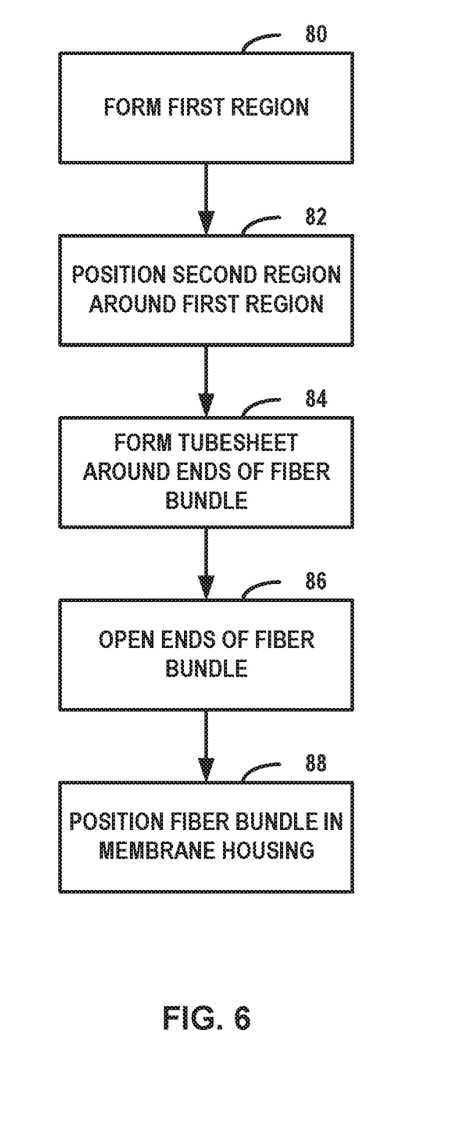
FIG. 6 is a flowchart illustrating one or more techniques for manufacturing an example fiber bundle of a membrane module.

FIG. 6 is a flowchart illustrating one or more techniques for manufacturing an example fiber bundle of a membrane module. The example techniques of FIG. 6 will be described with respect to fiber bundle 20 of FIG. 1A, fiber bundle 90 of FIGS. 7A-7C, and fiber bundle 100 of FIGS. 8A-8C; however, it will be understood that other fiber bundles may be formed using the techniques of FIG. 6.

In some examples, the technique of FIG. 6 may include forming a tubular first region (80). The technique of FIG. 6 includes forming a fiber bundle by positioning a tubular second region around a tubular first region (82). One of the first or second regions includes hollow fibers oriented along axis 21 of fiber bundle 20, while another of the first or second regions includes hollow fibers that are not colinear in a radial direction from axis 21 of fiber bundle 20. As such, a void fraction of the second region may be different from a void fraction of the first region. In some examples, a relative volume of colinear regions that include hollow fibers oriented along axis 21 of fiber bundle 20 and non-colinear regions that include hollow fibers that are not colinear in a radial direction from axis 21 of fiber bundle 20 may be selected to achieve a desired balance of properties colinear regions and non-colinear regions. For example, a fiber-side flow configuration may drive the relative volume between colinear regions and non-colinear regions. For air separation modules (ASM), flow may enter the module in a center of an inlet tubesheet. If all the fibers are the same (i.e., axially-aligned), more flow may enter the central fibers. The shell side flow configuration in the ASM (e.g., ASMs have one inlet and two outlets for product and vent) may consist of separated vent gas, which may itself act as a sweep gas if the low-efficiency vent gas closer to the outlet is swept towards the higher efficiency regions towards the inlet. As such, fiber densities, and correspondingly relative volume of colinear and non-colinear regions, may be used to direct the sweep gas flow. In some examples, a volume ratio of colinear regions to non-colinear regions may be between about 10:90 and about 90:10.

In some examples, the technique of FIG. 6 may include positioning one or more regions around the second region. For examples, the technique of FIG. 6 may include positioning hollow fibers around the second region and oriented along axis 21 of fiber bundle 20 to form a tubular colinear third region and positioning hollow fibers round the third region that are not colinear in the radial direction from the axis of the fiber bundle to form a tubular non-colinear fourth region. As such, a void fraction of the fourth region may be higher than a void fraction of the third region.

In some examples, the technique of FIG. 6 includes forming a tubesheet 13 around fiber bundle 20 (84). For example, one or more fiber bundles 20 may be enclosed in tubesheet 13 to reduce or prevent flow of fluid between a tube side to a shell side of fiber bundle 20 without passing through fiber bundle 20. The technique of FIG. 6 may include opening ends of the hollow fibers of fiber bundle 20 to expose a tube-side of the hollow fibers (86). For example, during application of binder and/or formation of tubesheet 13, ends of the hollow fibers may have become closed, such as from flow of the epoxy binder into end of the hollow fibers.

In some examples, the method includes positioning the fiber bundle in a membrane housing to encase fiber bundle 20 (88). For example, to form a separator module, fiber bundle 20 may be positioned in membrane housing 11 that includes first inlet 12 configured to receive a first fluid composition into a first end of fiber bundle 20, first outlet 14 configured to discharge a second fluid composition out of a second end of fiber bundle 20, and second outlet 18 configured to discharge a third fluid composition from a side of fiber bundle 20. For a contactor module, fiber bundle 20 may be positioned in membrane housing 11 that includes first inlet 12 configured to receive a first fluid composition into a first end of fiber bundle 20, first outlet 14 configured to discharge a second fluid composition out of a second end of fiber bundle 20, second inlet 16 configured to receive a third fluid composition from a first side of fiber bundle 20, and second outlet 18 configured to discharge a fourth fluid composition from a second side of fiber bundle 20.

Figure 7A:
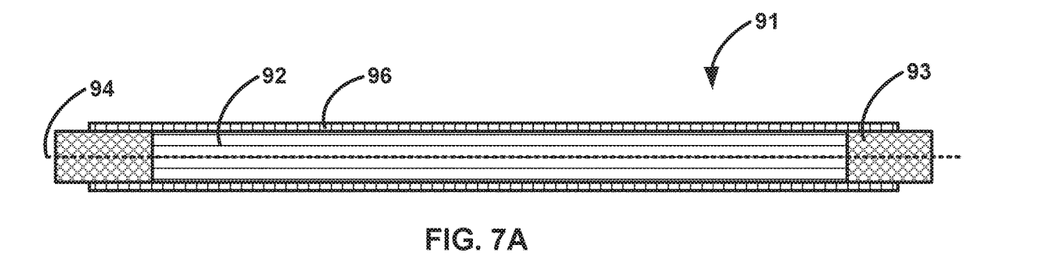
FIG. 7A is side view partial cross-sectional diagram of an example inner fiber bundle having colinear hollow fibers.
Figure 7B:
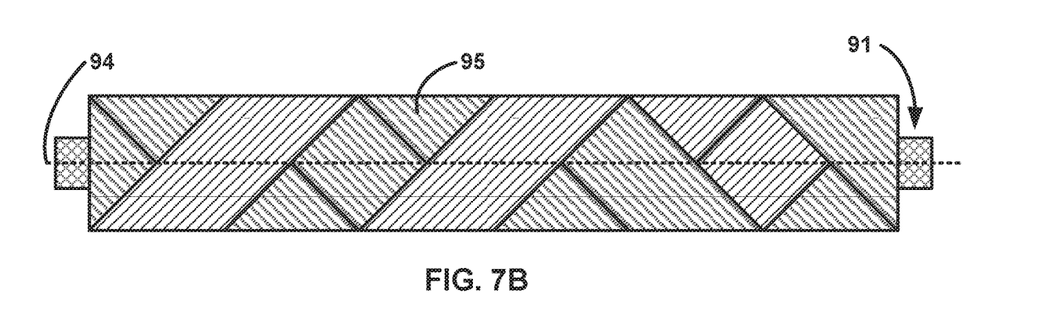
FIG. 7B is a side view cross-sectional diagram of an example fiber bundle intermediate.
Figure 7C:
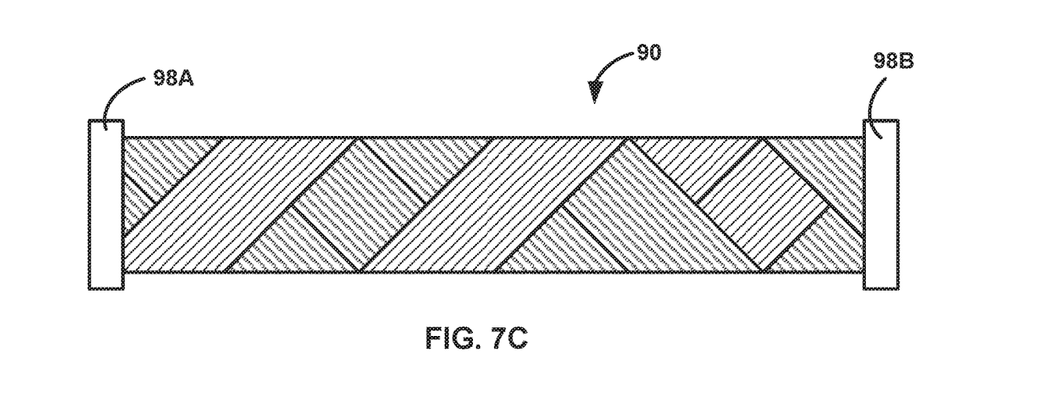
FIG. 7C is a side view cross-sectional diagram of an example fiber bundle.

In some examples, the example technique of FIG. 6 may be used to form an example fiber bundle that includes an inner colinear region and an outer non-colinear region. FIG. 7A is side view partial cross-sectional diagram of an example inner fiber bundle 91 having colinear hollow fibers. The technique of FIG. 6 may include forming inner colinear region 92 that includes hollow fibers oriented along an axis 94. In some examples, forming inner colinear region 92 may include positioning hollow fibers oriented along an axis of the fiber bundle into a porous shell 96. In some examples, forming inner colinear region 92 may include applying binder to a first end and a second end of inner colinear region 92 and cutting the binder to expose ends of the hollow fibers. FIG. 7B is a side view cross-sectional diagram of an example fiber bundle intermediate. The technique of FIG. 6 may include positioning outer non-colinear region 95 that includes hollow fibers that are not colinear in a radial direction from axis 94 around inner colinear region 92 by wrapping outer non-colinear region 94 around inner colinear region 92. FIG. 7C is a side view cross-sectional diagram of example fiber bundle 90. The technique of FIG. 6 may include forming tubesheets 98A and 98B around respective first and second ends of the hollow fibers to form fiber bundle 90.

Figure 8A:
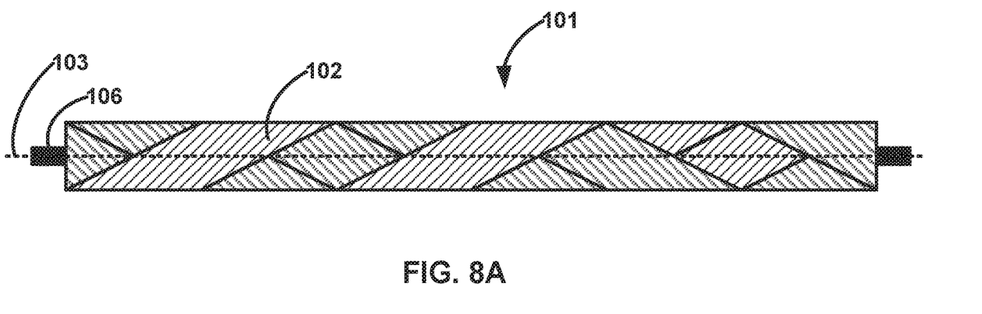
FIG. 8A is side view partial cross-sectional diagram of an example inner fiber bundle having colinear hollow fibers.

In some examples, the example technique of FIG. 6 may be used to form an example fiber bundle that includes an inner colinear region and an outer non-colinear region. FIG. 8A is side view partial cross-sectional diagram of an example inner fiber bundle having non-colinear hollow fibers. The technique of FIG. 6 may include forming inner non-colinear region 102 that includes hollow fibers that are not colinear in a radial direction from an axis 103, such as layers of groups of hollow fibers that are oriented in different directions from radially adjacent groups of hollow fibers. In some examples, forming inner non-colinear region 102 may include wrapping hollow fibers around mandrel 106.

Figure 8B:
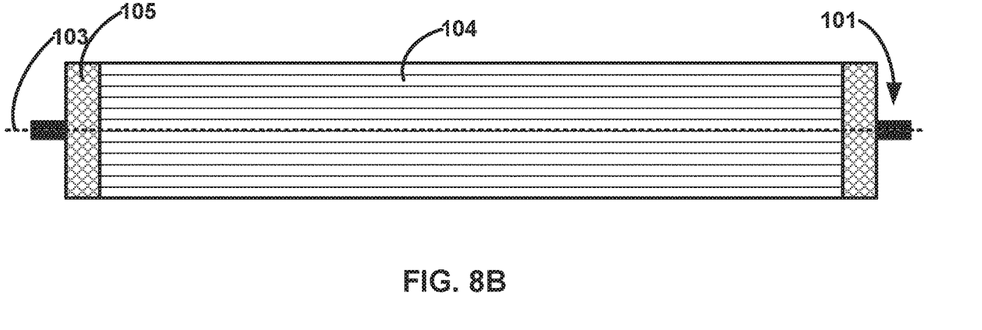
FIG. 8B is a side view cross-sectional diagram of an example fiber bundle intermediate.
Figure 8C:
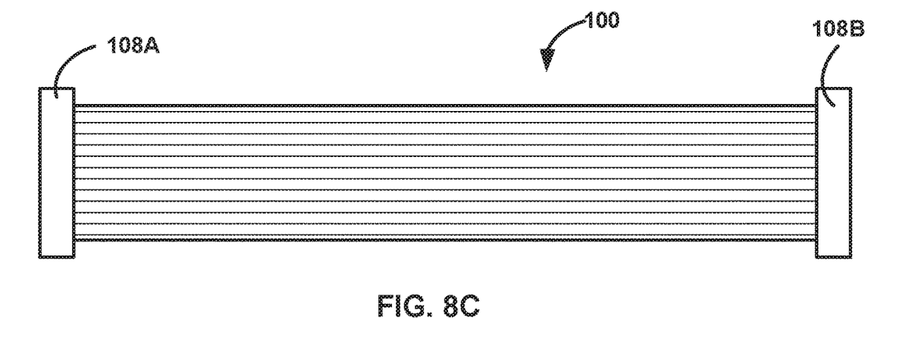
FIG. 8C is a side view cross-sectional diagram of an example fiber bundle.

FIG. 8B is a side view cross-sectional diagram of an example fiber bundle intermediate. The technique of FIG. 6 may include positioning hollow fibers oriented along the axis of the fiber bundle to form outer colinear region 104 around inner non-colinear region 102. In some examples, forming outer colinear region 104 may include positioning hollow fibers oriented along axis 103 of the fiber bundle into a porous shell (not shown). In some examples, forming outer colinear region 104 may include applying binder to a first end and a second end of outer colinear region 104 and cutting the binder to expose ends of the hollow fibers. FIG. 8C is a side view cross-sectional diagram of an example fiber bundle. The example of FIG. 6 may include forming tubesheets 108A and 108B around respective first and second ends of the hollow fibers to form fiber bundle 100.

Various examples have been described. These and other examples are within the scope of the following claims.

What is claimed is:

1. A membrane module, comprising:
   a fiber bundle, comprising:
      a tubular first region,
      a tubular second region positioned around the tubular first region, and
      a porous shell between the first region and the second region,
      wherein one of the first or second regions comprises hollow fibers oriented along an axis of the fiber bundle,
      wherein another of the first or second regions comprises hollow fibers that are not colinear in a radial direction from the axis of the fiber bundle,
      wherein the porous shell comprises a plurality of openings, and
      wherein the porous shell has a varying porosity along a length of the fiber bundle along the axis.

2. The membrane module of claim 1, wherein a void fraction of the second region is different from a void fraction of the first region.

3. The membrane module of claim 1, wherein a void fraction of the another of the first or second regions is higher than a void fraction of the one of the first or second regions.

4. The membrane module of claim 1,
   wherein the another of the first or second regions comprises a plurality of groups of the hollow fibers, and
   wherein each of the plurality of groups is not colinear in the radial direction from the axis of the fiber bundle.

5. The membrane module of claim 2,
wherein the first region comprises hollow fibers oriented along the axis of the fiber bundle,
wherein the second region comprises hollow fibers that are not colinear in the radial direction from the axis of the fiber bundle, and
wherein the void fraction of the second region is higher than the void fraction of the first region.

6. The membrane module of claim 2,
wherein the second region comprises hollow fibers oriented along the axis of the fiber bundle,
wherein the first region comprises hollow fibers positioned around a mandrel that are not colinear in the radial direction from the axis of the fiber bundle, and
wherein the void fraction of the first region is higher than the void fraction of the second region.

7. The membrane module of claim 1, further comprising:
a tubular third region comprising hollow fibers positioned around the second region and oriented along the axis of the fiber bundle; and
a tubular fourth region comprising hollow fibers that are not colinear in the radial direction from the axis of the fiber bundle,
wherein a void fraction of the fourth region is higher than a void fraction of the third region.

8. The membrane module of claim 1,
wherein the tubular first region is a spiral first region, and
wherein the tubular second region is a spiral second region spirally wound around the spiral first region.

9. The membrane module of claim 1, further comprising a membrane housing encasing the fiber bundle, wherein the membrane housing comprises:
an inlet configured to receive a first fluid composition into a first end of the fiber bundle;
a first outlet configured to discharge a second fluid composition out of a second end of the fiber bundle; and
a second outlet configured to discharge a third fluid composition from a side of the fiber bundle.

10. The membrane module of claim 9, wherein the inlet is a first inlet, wherein the side of the fiber bundle is a first side of the fiber bundle, and wherein the membrane module further comprises a second inlet configured to receive a fourth fluid composition into a second side of the fiber bundle.

11. A method for making a membrane module, comprising:
forming a fiber bundle by positioning a tubular second region around a tubular first region,
wherein one of the first or second regions comprises hollow fibers oriented along an axis of the fiber bundle,
wherein another of the first or second regions comprises hollow fibers that are not colinear in a radial direction from the axis of the fiber bundle,
wherein a void fraction of the second region is different from a void fraction of the first region,
wherein the fiber bundle comprises a porous shell between the first region and the second region,
wherein the porous shell comprises a plurality of openings, and
wherein the porous shell has a varying porosity along a length of the fiber bundle along the axis.

12. The method of claim 11,
wherein positioning the second region around the first region comprises wrapping the tubular second region around the tubular first region,
wherein the first region comprises hollow fibers oriented along the axis of the fiber bundle,
wherein the second region comprises hollow fibers that are not colinear in the radial direction from the axis of the fiber bundle, and
wherein the void fraction of the second region is higher than the void fraction of the first region.

13. The method of claim 12, wherein forming the fiber bundle further comprises forming the first region by positioning the hollow fibers of the one of the first or second regions that comprises hollow fibers oriented along an axis of the fiber bundle into the porous shell.

14. The method of claim 12, wherein forming the fiber bundle further comprises forming the first region by:
applying binder to a first end and a second end of the one of the first or second regions that comprises hollow fibers oriented along an axis of the fiber bundle; and
cutting the binder to expose ends of the hollow fibers.

15. The method of claim 11, further comprising:
positioning hollow fibers around the second region and oriented along the axis of the fiber bundle to form a tubular third region; and
positioning hollow fibers round the third region that are not colinear in the radial direction from the axis of the fiber bundle to form a tubular fourth region,
wherein a void fraction of the fourth region is higher than a void fraction of the third region.

16. The method of claim 11, further comprising positioning the fiber bundle in a membrane housing to encase the fiber bundle, wherein the membrane housing comprises:
an inlet configured to receive a first fluid composition into a first end of the fiber bundle;
a first outlet configured to discharge a second fluid composition out of a second end of the fiber bundle; and
a second outlet configured to discharge a third fluid composition from a side of the fiber bundle.

17. The method of claim 16, wherein the inlet is a first inlet, wherein the side of the fiber bundle is a first side of the fiber bundle, and wherein the membrane module further comprises a second inlet configured to receive a fourth fluid composition into a second side of the fiber bundle.

18. A method of removing a contaminant from a first fluid, comprising:
receiving, by a first inlet of a membrane module, a first fluid composition into a first end of a fiber bundle;
discharging, by a first outlet of the membrane module, a second fluid composition out of a second end of the fiber bundle, wherein the second fluid composition has a different concentration of the contaminant than the first fluid composition;
receiving, by a second inlet of the membrane module, a third fluid composition to a side of the fiber bundle; and
discharging, by a second outlet of the membrane module, a fourth fluid composition from a side of the fiber bundle, wherein the fourth fluid composition has a different concentration of the contaminant than the third fluid composition;
wherein the fiber bundle comprises:
a tubular first region;
a tubular second region positioned around the tubular first region,
a porous shell between the first region and the second region,
wherein one of the first or second regions comprises hollow fibers oriented along an axis of the fiber bundle,
wherein another of the first or second regions comprises hollow fibers that are not colinear in a radial direction from the axis of the fiber bundle, wherein a void fraction of the second region is different from a void fraction of the first region, wherein the porous shell comprises a plurality of openings, and wherein the porous shell has a varying porosity along a length of the fiber bundle along the axis.

19. The membrane module of claim 9, wherein a surface area of the plurality of openings at the second end is at least 10% greater than a surface area of the plurality of openings at the first end.

20. The membrane module of claim 1, wherein the porous shell comprises a perforated cylinder.

* * * * *